Jan. 18, 1949.         B. J. CRAIG                2,459,502
                       DOOR DEVICE
Original Filed Feb. 12, 1940                3 Sheets-Sheet 1
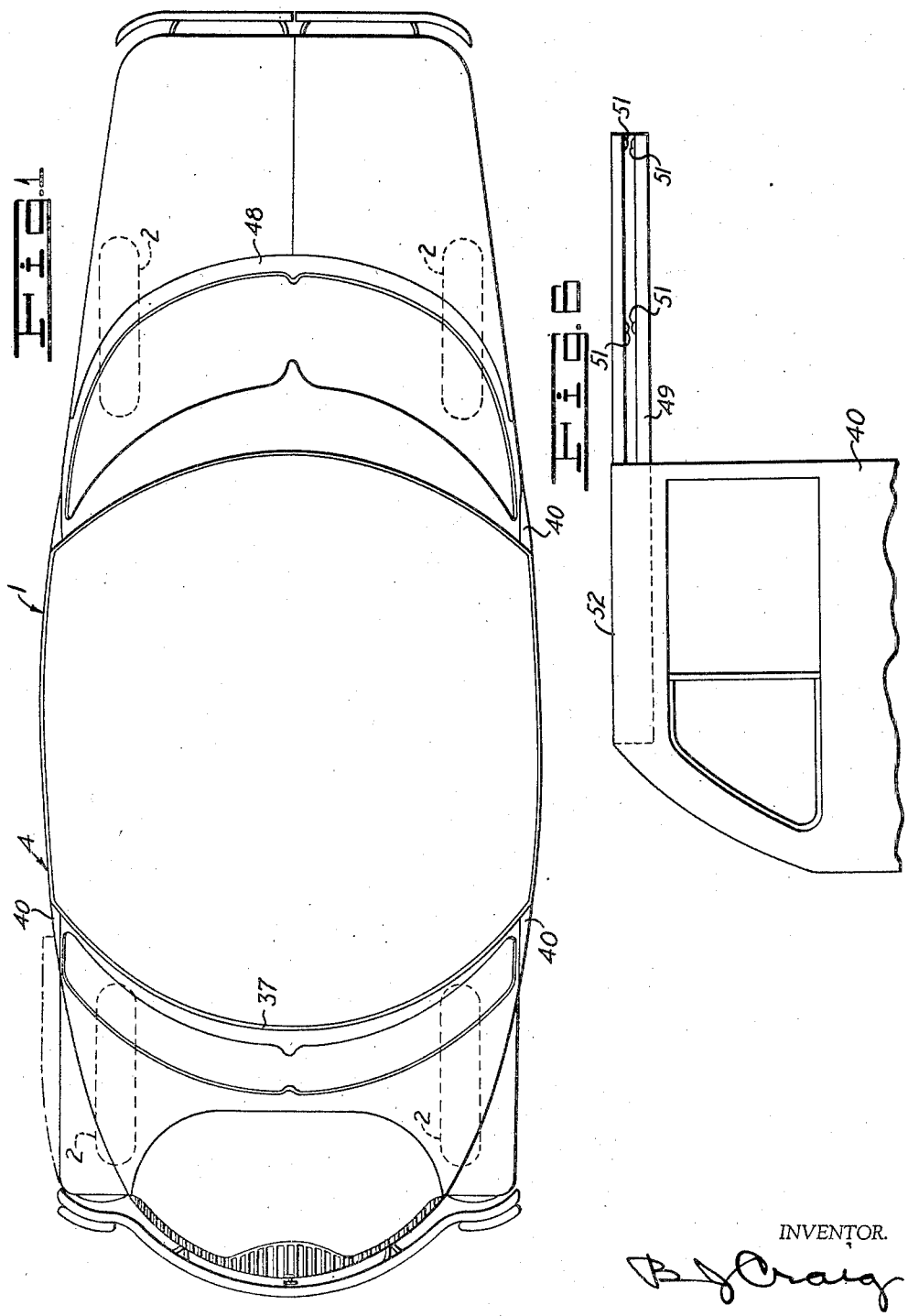
INVENTOR.
B. J. Craig Jan. 18, 1949.　　　　B. J. CRAIG　　　　2,459,502
DOOR DEVICE
Original Filed Feb. 12, 1940　　　　3 Sheets-Sheet 2
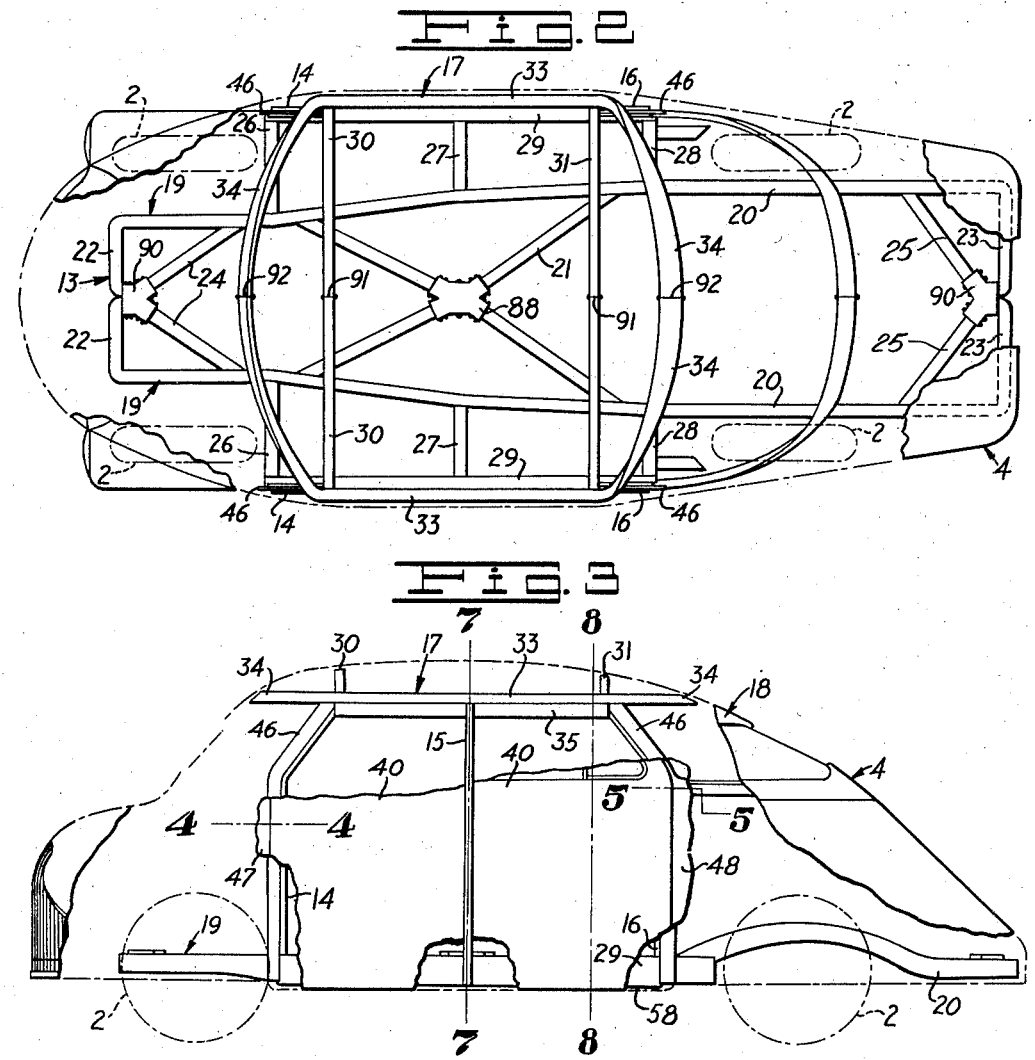
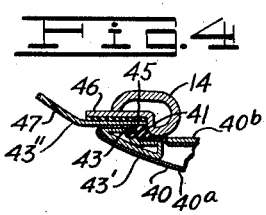
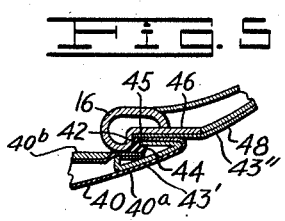
INVENTOR.
B. J. Craig

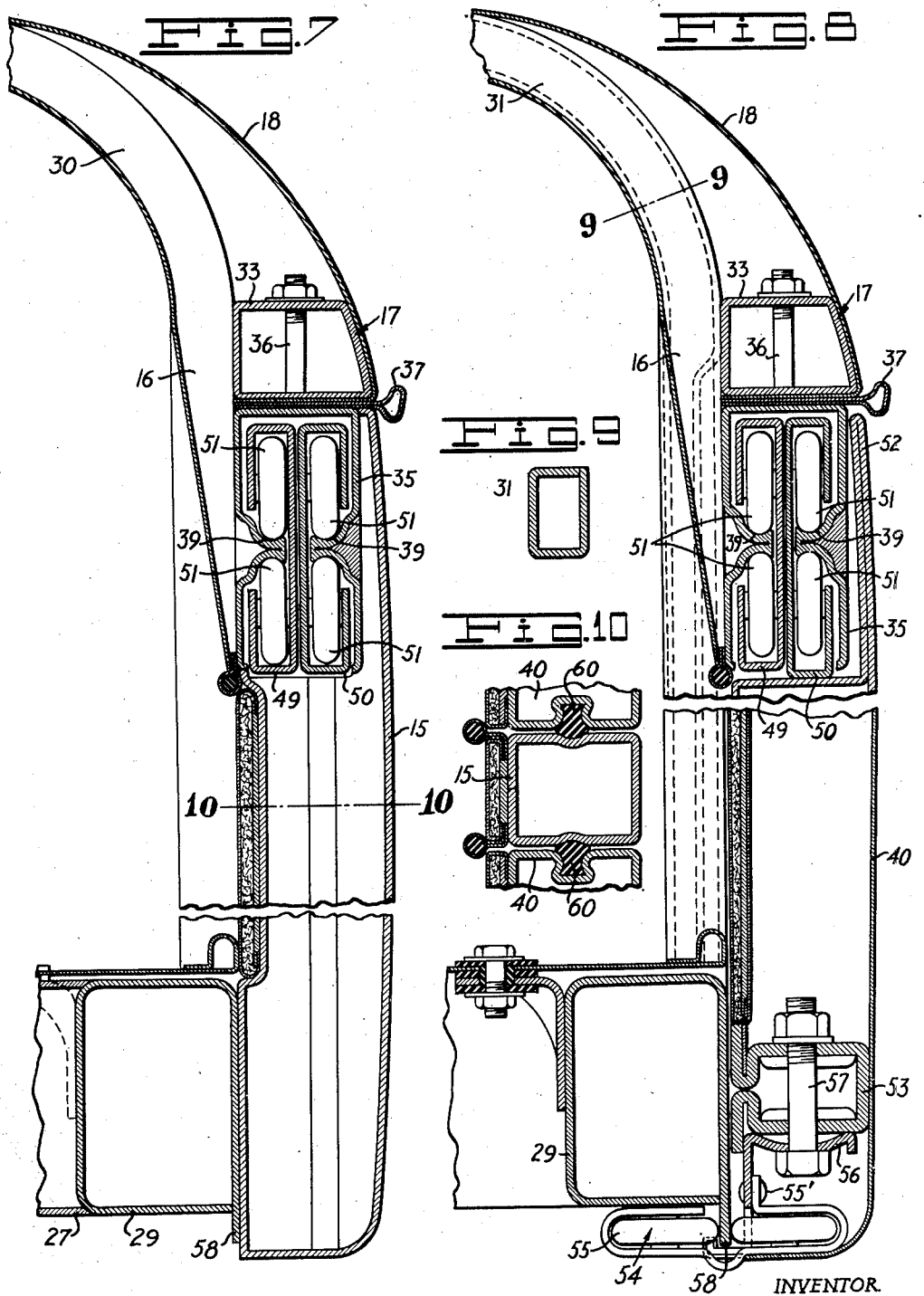

Patented Jan. 18, 1949

2,459,502

UNITED STATES PATENT OFFICE 2,459,502

DOOR DEVICE

Burnie J. Craig, Los Angeles, Calif.

Original application February 12, 1940, Serial No. 318,397. Divided and this application April 17, 1944, Serial No. 531,453

5 Claims. (Cl. 296—47)

This invention relates to a door device.

The general object of the invention is to provide a novel door construction particularly adapted for use in automotive vehicles.

A further object of the invention is to provide a door construction having novel mounting means thereon and adapted for use on automotive vehicles.

Another object of the invention is to provide a novel means for slidably mounting an automotive vehicle door on an automotive vehicle body.

An additional object of the invention is to provide a novel construction providing smooth contours at the joint between a sliding automotive vehicle door and its body.

A further object of the invention is to provide a novel construction for sealing the joint between an automotive vehicle door and its body.

Other objects and the advantages of this invention will be apparent from the following description taken in connection with the accompanying drawings, wherein:

Fig. 1 is a top plan view of a vehicle which has door devices thereon embodying the features of this invention;

Fig. 2 is a top plan view of the vehicle with the body panels partly broken away to show the frame;

Fig. 3 is a side elevation of the vehicle with the body panels partly broken away to show the frame;

Fig. 4 and Fig. 5 are enlarged fragmentary sections taken on lines 4—4, and 5—5, respectively, Fig. 3;

Fig. 6 is a fragmentary elevation showing the upper portion of a door;

Fig. 7 and Fig. 8 are fragmentary, enlarged sections taken on lines 7—7 and 8—8, respectively, Fig. 3;

Fig. 9 is a section taken on line 9—9, Fig. 8, and

Fig. 10 is a section taken on line 10—10, Fig. 7.

This application is a division of application Serial No. 318,397, filed February 12, 1940, now Patent No. 2,349,940, granted May 30, 1944.

Referring to the drawings by reference characters, the invention is shown as embodied in an automotive vehicle which is indicated generally at 1. The vehicle includes wheels 2 which support a body 4.

The body includes a frame 13 which supports front door and windshield pillars 14, body pillars 15, and rear door pillars 16. The pillars support an upper frame member 17 which connects the pillars to provide the body with substantially planar framed door openings. The upper frame member 17 is engaged by a top 18.

As shown the frame includes two half-frame members 19 (see Fig. 2) each having a side rail 20 with a half-X cross member 21 secured thereto. Each rail 20 further has a front half-cross member 22 and a rear half-cross member 23 secured thereto. The half-cross members 22 and 23 are shown as braced by diagonal members 24 and 25.

Each rail 20 further includes outwardly directed hangers 26, 27 and 28 which support outer rail members 29 which latter in turn support the pillars 14, 15 and 16 previously mentioned. In the disclosure the pillars 14 and 16 are continued inwardly above the door areas as at 30 and 31 to engage the top.

The upper half-frame members 17 each includes an intermediate portion 33 which connects the pillars and which is supported on the top of the body pillars 15 as by welding and is secured to the outer face of the upper ends of the door pillars 14 and 16. The upper half-frame members 17 as shown each include end portions 34 which engage the inner surface of the front and rear of the top 18.

The half-frames are shown as secured together by members 88 and 90 while the portions 30—31 and 34 are shown as welded together at 91 and 92, respectively.

In the disclosure the members 17 support track members 35 which serve to support sliding doors. The track members 35 as shown are of general inverted U-shape and secured in place as by bolts 36 inserted through suitable apertures in the members 17. A drain and trim strip 37 may be included between the members 17 and 35 and this trim strip may align with trim strips secured to the top 18.

Without inferential limitation to such shapes, certain of the part-frame members are shown as tubular in form being, for instance, substantially rectangular in cross section thereby providing great strength with a minimum of weight.

The members 14 and 16, within the area of the doors, are preferably of the cross section shown in Figs. 4 and 5, respectively, and include outwardly directed shoulders 41 and 42 which engage inwardly directed shoulders 43 and 44 on the doors. Direct contact of the shoulders may be prevented by rubber cushion members 45. Each door indicated at 40 includes an outer panel 40a and an inner, substantially planar panel 40b spaced from the panel 40a. The doors are rounded about up and down axes as at 43' adjacent to the shoulders 43 and 44 to form an unbroken contour with the adjacent side wall portions of the body which are rounded about up and down axes as at 43''. The pillars 14 and 16 include projecting flanges 46 on which panels 47 and 48 constituting a part of the body are secured.

As shown the doors 40 include projecting cantilever arms 49 and 50 which support rollers 51. On each side of the vehicle the cantilever arms on the front and rear doors are arranged to move in parallel spaced planes so that they do not interfere with each other's movement. The cantilever construction permits the doors to be opened fully as shown in Fig. 1 (in broken lines) while still maintaining the rollers 51 in engagement with their respective tracks.

The doors 40 include upper flanges 52 which extend over the area of the tracks. Each door also includes a lower frame and bumper member 53 which extends across the door and has a width equalling the thickness of the door. The member 53 is disposed in alignment with the adjacent outer rail 29 so that on slight movement of the door inwardly the bumper directly engages the frame rail and thereby serves as a crash bumper to transfer the impact of blows directly onto the frame thus protecting the door.

The frame and bumper members 53 each support roller assemblies 54 including rollers 55. The assemblies 54 are secured at 55' to an inner door frame member 56 clamped to the bumper 53 by bolts 57. The rollers 55 are spaced to receive a flange 58 which is shown as a continuation of one side of the outer rail 29 so that the need for a separate track for the lower rollers is avoided.

Above the door areas the portions 30 and 31 of the members 14 and 16 may be of the shape shown in Fig. 9 with the flange 46 omitted. The perimeter of the closed portions of the members 14 and of the members 16 and their extensions 30 and 31 is preferably uniform throughout their lengths.

The doors include cushion members 60 (see Fig. 10) which are positioned to engage the pillar 15 and thereby form a weather tight joint. The track members 35 and rollers 51 provide coacting guide means for the doors so that the doors may slide outwardly and clear of the rounded body side wall in a continuous path without the use of offsetting tracks or link-hinges. The shoulders 41 and 42 and the pillars 15 act as stop members to limit the closing movement of the doors.

Having thus described my invention, I claim:

1. An automotive vehicle construction including a body, said body having a framed door opening with one edge of the opening defined by a portion having an outwardly directed shoulder, said body, adjacent to the shoulder, having a side wall which is rounded about an up and down axis and a door, coacting guide means on the door and body to mount the door for sliding movement, said door including an outer panel which is rounded about an up and down axis at the one end which trails when the door is being closed, said door at the one end having an inwardly directed shoulder engageable with said outwardly directed body shoulder, said door having an inner panel spaced from the outer panel, said door being slidable across the framed opening in such a manner that the inwardly directed shoulder on the door may slide outwardly and clear of the rounded body side wall in a continuous path without the use of offsetting tracks or link-hinges.

2. An automotive vehicle construction including a body having a framed door opening, a door for the opening, coacting means on the body and door to mount the door for sliding movement, the framed opening being defined, adjacent to the location where one end of the door is positioned when the door is closed, by a body side wall portion which is rounded about an up and down axis, the door including inner and outer panel portions, the door at the one end being rounded about an up and down axis, the body having a stop forming shoulder portion and the door having a portion engageable with the shoulder portion to limit the closing movement of the door, the door being slidable across the framed opening in the body in such a manner that the inner panel portion of the door may slide clear of the rounded body side wall portion in a continuous path without the use of offsetting tracks or link-hinges.

3. An automotive vehicle construction including a body having a substantially planar framed door opening with one edge of the opening defined by a portion having an outwardly directed shoulder, a door for the opening, coacting guide means on the door and body to mount the door for sliding movement, the door on the one end which trails when the door is being closed having an inwardly directed shoulder engageable with the outwardly directed body shoulder, the planar framed opening being defined, adjacent to the location where the one end of the door is positioned when the door is closed, by a side wall portion which is rounded about an up and down axis, the door having an outer panel which is rounded about an up and down axis at the said one end and having a substantially planar inner panel spaced from the outer panel, the door being slidable across the framed door opening in such a manner that the inwardly directed shoulder on the edge of the door may slide outwardly and clear of the rounded body side wall portion in a continuous path without the use of offsetting tracks or link-hinges.

4. An automotive vehicle construction including a body having a pair of adjacent framed door openings, a door for each opening, coacting means on the body and doors to mount each door for sliding movement, each framed opening being defined, adjacent to the location where one end of the door for that opening is positioned when the door is closed, by a body side wall portion which is rounded about an up and down axis, each door having an outer panel which, at the one end, is rounded about an up and down axis, each door having an inner panel portion, the body having stop forming projecting shoulder portions and each door having a projecting portion engageable with a body shoulder portion, each door being slidable across its framed opening in the body in such a manner that the inner panel portion of the door may slide clear of the adjacent rounded body side wall portion in a continuous path without the use of offsetting tracks or link-hinges.

5. An automotive vehicle body having front and rear door openings, a forwardly opening front door and a rearwardly opening rear door for the openings, each door comprising a single unit, the inside surface of the doors when closed being substantially coplanar, the upper portion of the front door having a rearwardly projecting supporting member disposed over the rear door when both doors are closed, the upper portion of the rear door having a forwardly projecting supporting member disposed over the front door when both doors are closed and hanger means on the car body slidably engaging and supporting the supporting members, the hanger means being disposed so that the doors move along the extreme outer face of the body, the portion of each door which leads when the door is being opened being free of attachment to the hangers.

BURNIE J. CRAIG.

REFERENCES CITED

The following references are of record in the file of this patent:

UNITED STATES PATENTS

| Number | Name | Date |
|---|---|---|
| Re. 17,610 | Whitney | Mar. 4, 1930 |
| D. 85,298 | Montgomery | Oct. 6, 1931 |
| D. 96,860 | Ryan | Sept. 10, 1935 |
| 643,307 | Schmitt | Feb. 13, 1900 |
| 989,488 | Danner | Apr. 11, 1911 |
| 1,040,483 | Zirkle | Oct. 8, 1912 |
| 1,051,916 | Romer et al. | Feb. 4, 1913 |
| 1,152,665 | Sneddon | Sept. 7, 1915 |
| 1,219,863 | Phillips | Mar. 20, 1917 |
| 1,403,945 | Guerrant | Jan. 17, 1922 |
| 1,712,588 | Small | May 14, 1929 |
| 1,928,523 | Bally | Sept. 26, 1933 |
| 1,957,645 | Herman | May 8, 1934 |
| 1,959,706 | Christianson et al. | May 22, 1934 |
| 2,170,870 | Nichols | Aug. 29, 1939 |
| 2,338,309 | Votypka | Jan. 4, 1944 |

FOREIGN PATENTS

| Number | Country | Date |
|---|---|---|
| 299,179 | Great Britain | Oct. 25, 1928 |
| 310,626 | Great Britain | May 2, 1929 |
| 389,061 | Great Britain | May 28, 1931 |
| 482,199 | Great Britain | Mar. 22, 1938 |
| 493,234 | Great Britain | Oct. 5, 1938 |
| 505,672 | Great Britain | May 16, 1939 |